(12) United States Patent
Iverson

(10) Patent No.: US 10,709,136 B2
(45) Date of Patent: Jul. 14, 2020

(54) METHOD OF SUSPENDING WEED GROWTH IN SOIL

(71) Applicant: CH2O Incorporated, Olympia, WA (US)

(72) Inventor: Carl E. Iverson, Olympia, WA (US)

(73) Assignee: CH2O Incorporated, Olympia, WA (US)

( * ) Notice: Subject to any disclaimer, the term of this patent is extended or adjusted under 35 U.S.C. 154(b) by 0 days.

(21) Appl. No.: 15/279,893

(22) Filed: Sep. 29, 2016

(65) Prior Publication Data

US 2017/0013841 A1   Jan. 19, 2017

Related U.S. Application Data

(60) Continuation of application No. 13/159,260, filed on Jun. 13, 2011, now abandoned, which is a division of application No. 12/156,638, filed on Jun. 3, 2008, now abandoned.

(51) Int. Cl.
*A01N 59/00* (2006.01)
*C01B 11/02* (2006.01)
*A01N 59/26* (2006.01)

(52) U.S. Cl.
CPC ............ *A01N 59/00* (2013.01); *A01N 59/26* (2013.01); *C01B 11/022* (2013.01)

(58) Field of Classification Search
CPC ....... A01N 59/00; A01N 59/26; C01B 11/022
See application file for complete search history.

(56) References Cited

U.S. PATENT DOCUMENTS 5,586,728 A * 12/1996 McKenry .............. A01M 21/00
239/310

FOREIGN PATENT DOCUMENTS

| JP | 08283112 A | * | 10/1996 | |
| JP | 09278614 A | * | 10/1997 | |
| WO | WO 0158265 A2 | * | 8/2001 | |
| WO | WO 0212130 A1 | * | 2/2002 | ................ C02F 1/50 |

OTHER PUBLICATIONS

JP 08-283112, Internet Translation, pp. 1-6.*

* cited by examiner

*Primary Examiner* — John Pak
*Assistant Examiner* — Andriae M Holt
(74) *Attorney, Agent, or Firm* — Fish & Richardson P.C.

(57) ABSTRACT

Introducing chlorine dioxide solution into an agricultural soil in an amount effective to suspend weed and pathogen growth in the soil. The chlorine dioxide is allowed to decompose in the soil. Then, a crop is planted in the treated soil. The decomposed chlorine dioxide provides nutrients for the crops as they grow.

8 Claims, 1 Drawing Sheet

METHOD OF SUSPENDING WEED GROWTH IN SOIL

CROSS-REFERENCE TO RELATED APPLICATION

This application is a continuation of U.S. application Ser. No. entitled "METHOD OF SUSPENDING WEED GROWTH IN SOIL" and filed on Jun. 13, 2011, which is a divisional of U.S. application Ser. No. 12/156,638 entitled "METHOD OF SUSPENDING WEED GROWTH IN SOIL" and filed on Jun. 3, 2008, now abandoned, both of which are incorporated herein by reference.

TECHNICAL FIELD

This invention relates to a method of suspending weed and pathogen growth in soil prior to growing a crop in the soil. More particularly, it relates a method of introducing chlorine dioxide into the soil in an amount sufficient to suspend weed and pathogen growth and then planting and growing a crop in the treated soil.

BACKGROUND

It is known to treat plant growing soil with fumigants to prevent the harmful effects of invasive weeds and other unwanted vegetation and pathogens. If allowed to grow, these invasive plants would compete with the agricultural crops for water, minerals and sunlight. They would increase stresses from nematodes, insects and disease, and adversely affect product quality. Also, harvest efficacy is diminished due to pickers inability to find and pick produce in weedy growth. Unwanted vegetation increases production costs by adding control costs up to several hundred dollars per acre.

Methyl-bromide (M-b) has been the most effective fumigant for agricultural and ornamental plant applications. M-b is usually applied by one of two methods. The first and most popular method is called "flat field" fumigation. The ground is prepared for bed-making and is irrigated lightly to induce weed seeds to become more active or "viable" and thus more susceptible to the penetration of the poison gas. Then the M-b gas is applied to the flat, level soil by injection equipment mounted on tractors. Simultaneously, the gas is sealed in the soil beneath solid plastic sheeting which is provided as a cover over the soil. Tractors carry large pressurized cylinders of M-b gas and rolls of clear plastic sheeting (e.g., 4 mil thick and 12 feet wide). These tractors pass across the field and inject the M-b about twelve inches deep into the soil. Injection shanks are designed to release the gas in a way that prevents it from escaping the soil too rapidly. The plastic sheeting unrolls from the rear of the tractor as gas is applied and the sides of the sheeting are continuously buried to seal the gas below the plastic. The plastic sheets are left sealed for at least six days to allow the gas to dissipate to safe concentrations. Then, the plastic is removed and discarded. The agricultural beds are made and new plastic sheeting is laid out on top of the beds.

The second method of fumigation has been named the "bed fume" method. It involves making the beds first (e.g. about 64 inches wide) and then injecting the M-b gas into each individual bed. Plastic sheets are stretched across the beds and buried, using the same tractor that injects the gas. These beds are ready for planting after sitting for six days. The fumigation plastic cover is left on the bed and becomes the bed mulch.

Many countries are restricting or eliminating the use of M-b because it is now labeled as an ozone depleting substance. Other alternative fumigants have been tried without success.

There is a need for a way of suspending undesirable plant growth without using a substance that adversely effects the desirable plant growth and/or the environment. This substance must effectively suspend the undesirable plant growth without harming the agricultural or ornamental crop that is planted or growing in the soil, and without harming the environment.

SUMMARY

The present invention provides a method of growing a crop in an agricultural soil. The method comprises introducing a chlorine dioxide solution into the soil in an amount effective to suspend weed and pathogen growth in the soil. The chlorine dioxide solution is allowed to decompose in the soil. A crop may be planted in the treated soil bed. This treatment suspends weed and pathogen growth in the soil without adverse effects to the planted crop or negative consequences to the environment. Chlorine dioxide decomposes into nutrients for the crops.

Preferably, the chlorine dioxide is prepared by forming a water and acid first solution and adding it to a water and sodium chlorite second solution. Sufficient contact time is allowed to convert the combined solutions into a chlorine solution. The chlorine dioxide is easily applied via the irrigation system to the planted crops in the soil beds, e.g. by adding it to water to pump through the line.

The first solution may be prepared by combining water, PBTC and hydrochloric acid. "PBTC" is phosphonobutane-tricarboxylic acid. The use of PBTC with the hydrochloric acid and the sodium chloride results in the decomposed chlorine dioxide providing oxygen, water, sodium chloride and phosphorus to the crops in the soil. These substances act as nutrients for the crops.

Preferably, the method includes providing a water component to the soil sufficient to cause the weed seeds to become more active and susceptible to the growth suspending defects of the chlorine dioxide when it is applied.

The practice of the invention may include covering the soil for at least a part of the time that the chlorine dioxide is decomposing.

Further objects, advantages and features of the invention will be apparent from the description of the preferred and other embodiments that follow.

BRIEF DESCRIPTION OF THE DRAWINGS

Like reference numerals will be used throughout the several views of the drawing, and.

DETAILED DESCRIPTION

The soil must be available or provided. This may entail plowing and tiling a field or providing growing beds composed of bed frames and natural soils or other growing mediums placed in the frames. The soil or other bedding material will usually include the seeds of weeds and other invasive vegetation that will cause the above-discussed problems unless their growth is suspended. According to the invention, chlorine dioxide is used to suspend the undesirable invasive plant growth.

Figure 1:
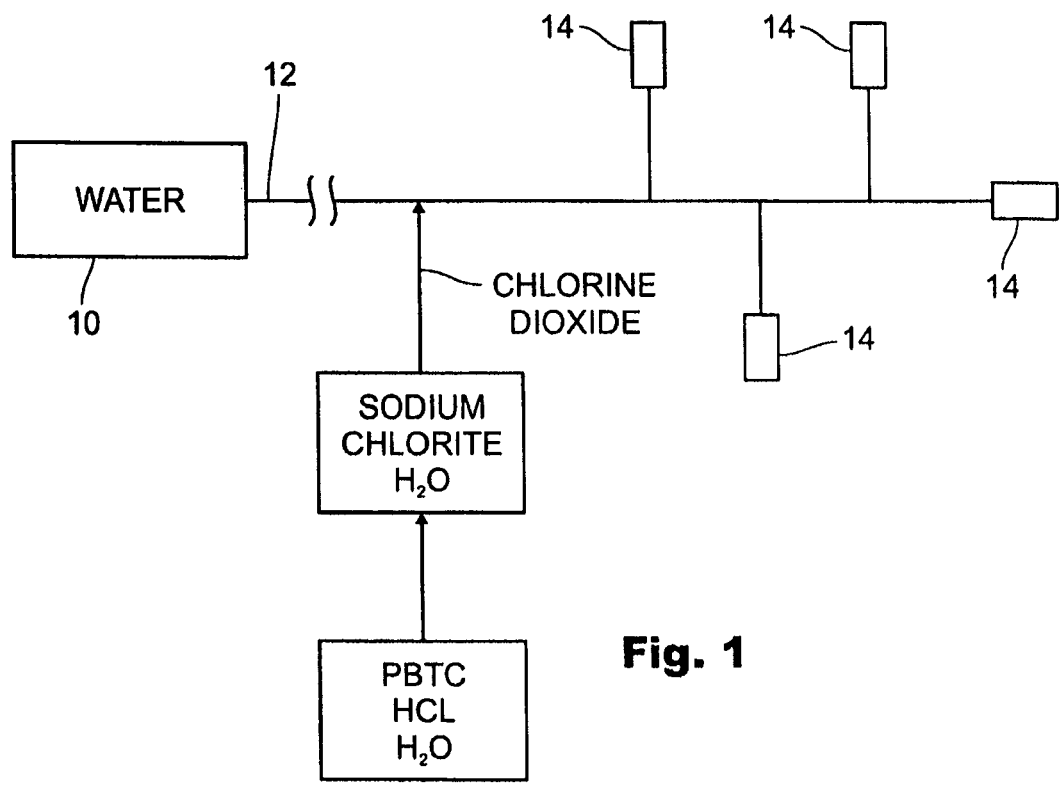
FIG. 1 is a flow diagram showing a solution of water and acid being added to a solution of sodium chlorite and water to form a combined solution (herein termed the chlorine dioxide), and showing the chlorine dioxide being delivered into irrigation water in a conduit leading to irrigation emitters.
Figure 2:
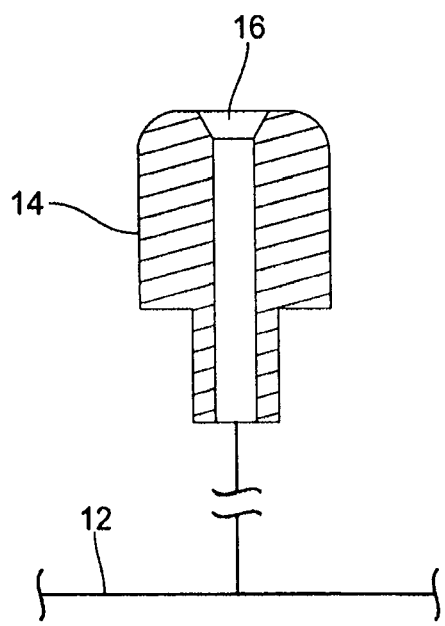
FIG. 2 is a schematic view of one of the emitters shown in FIG. 1.

Referring to FIG. 1, chlorine dioxide may be prepared by admixing acid in water to form a first solution; admixing sodium chlorite and water to form a second solution; and combining the two solutions to produce a combined solution that is delivered to the soil, such as by use of the irrigation system provided for delivering water and water carried nutrients to the crops as they are growing in the growing bed. A source of irrigation water is labeled 10. This irrigation water is delivered by a conduit 12 to emitters. Drip irrigation conduits can generally be classified in two types: conduits having discreet emitters and conduits having continuous, integral emitters. FIG. 2 is representative of a discreet emitter 14. It is connected at one end of the conduit 12 and has a discharge outlet 16 at its opposite end. An example of a drip irrigation system having discreet emitters is shown by U.S. Pat. No. 4,850,531, granted Jul. 25, 1989, to Kermit R. Littleton. An example of a drip irrigation conduit having continuous, integral emitters is shown by U.S. Pat. No. 4,247,051, granted Jan. 27, 1981, to Davies Allport. A supplier of irrigation conduit with the emitters incorporated into the conduit is T-Systems International, located in San Diego, Calif., USA.

Accordingly, the chlorine dioxide is formed and is delivered to the growing beds and the soil or other growing medium in the beds are contacted by chlorine dioxide for a sufficient time to allow the solution to decompose in the soil and both suspend weed and pathogen growth in the soil, and decompose into components which are beneficial to the desired plant growth without adverse effects to the environment.

EXAMPLE

Water (27.5%), PBTC (17.5%) and hydrochloric acid (HCl) (55%) were admixed to form a first solution. Water (85%) and sodium chlorite (15%) were admixed to form a second solution. The first and second solutions were combined to form a combined solution. Sufficient contact time was allowed in the mixing vessel 12 to convert a substantial portion of the sodium chlorite solution into chlorine dioxide. The combined solution can also be referred to as chlorine dioxide. For test purposes, five soil beds were prepared. These beds were covered with sheet plastic. In the first bed, 150 ppm of chlorine dioxide was added irrigation water and the mixture was introduced to the soil bed until the soil bed was saturated. In the second soil bed, 350 ppm of chlorine dioxide was added to irrigation water and the mixture was introduced into the second soil bed until the second soil bed was saturated. The third soil bed received 750 ppm of chlorine dioxide in irrigation water until that bed was saturated. The fourth soil bed received a mixture of 950 ppm of chlorine dioxide in irrigation water until that soil bed was saturated. The fifth soil bed was treated with methyl-bromide at E.P.A. label recommended dose rates.

After six days of treatment, all four dosages of the chlorine dioxide and irrigation water treated beds were found to suspend weed and undesirable plant growth entirely, in equal to the performance of the methyl-bromide but without any negative consequences to the environment. The chlorine dioxide decomposed into oxygen, water, sodium chloride, and phosphorus becoming nutrients for the crops and not harming the environment. The methyl-bromide, on the other hand, even though effective as a fumigant, had an adverse effect on the environment.

The yield performance of chlorine dioxide treated soils exceeded the methyl bromide treated soils. The higher chlorine dioxide levels demonstrated greater yields. See table below.

| Soil Treatment | Crates/ Acres | Marketable Crates/ Acre | Fruit | | |
|---|---|---|---|---|---|
| | | | Grams | Appearance | Firmness |
| Methyl Bromide (used as at EPA label requirements) | 455 | 428 | 32.8 | 3.1 | 4.0 |
| Chlorine Dioxide (75 ppm solution) | 495 | 431 | 25.5 | 3.2 | 3.8 |
| Chlorine Dioxide (175 ppm solution) | 483 | 435 | 26.6 | 3.4 | 4.0 |
| Chlorine Dioxide (375 ppm solution) | 429 | 572 | 27.1 | 3.3 | 3.9 |
| Chlorine Dioxide (475 ppm solution) | 651 | 605 | 28.9 | 3.3 | 4.0 |

The chlorine dioxide treatment can be used with any growing soil or soil bed in which it is desirable to prevent the harmful effects of invasive weeds and other unwanted vegetation. This includes soil used to grow food, crops and soil used to grow ornamental plants. At times, it may be necessary or desirable to irrigate the soil before treatment to allow the undesirable plant seeds to become more active due to the water component and thus more susceptible to the growth suspension when the chlorine dioxide is applied.

The invention is not to be limited by the foregoing description but rather is to be determined by the claims that follows, interpreted by the established rules of patent claim interpretation.

What is claimed is:

1. A method of treating soil, the method comprising:
   combining a first solution comprising phosphonobutane tricarboxylic acid, hydrochloric acid, and water and a second solution comprising a chlorite salt and water to yield a third solution comprising solubilized chlorine dioxide,
   providing the third solution inline to an irrigation system, wherein the irrigation system is configured to deliver water and water-carried nutrients to crops growing in the soil;
   introducing the solubilized chlorine dioxide into the soil through one or more drip irrigation conduits of the irrigation system in an amount effective to suspend weed and pathogen growth in the soil, wherein the effective amount of the solubilized chlorine dioxide is at a concentration in a range between 150 ppm to 950 ppm; and
   allowing the solubilized chlorine dioxide to decompose in the soil for a period of time before planting a crop in the soil.

2. The method of claim 1, wherein the chlorite salt is sodium chlorite.

3. The method of claim 1, wherein the one or more drip irrigation conduits comprise discrete emitters.

4. The method of claim 1, wherein the one or more drip irrigation conduits comprise continuous, integral emitters.

5. The method of claim 1, further comprising covering the soil for at least part of the time that the solubilized chlorine dioxide is decomposing in the soil.

6. The method of claim 1, further comprising irrigating the soil with the irrigation system prior to introducing the solubilized chlorine dioxide into the soil.

7. The method of claim 1, wherein introducing the solubilized chlorine dioxide into the soil comprises saturating the soil with water.

8. The method of claim 1, wherein the period of time before planting a crop in the soil is at least 6 days.

\* \* \* \* \*

UNITED STATES PATENT AND TRADEMARK OFFICE
CERTIFICATE OF CORRECTION

PATENT NO. : 10,709,136 B2
APPLICATION NO. : 15/279893
DATED : July 14, 2020
INVENTOR(S) : Carl E. Iverson It is certified that error appears in the above-identified patent and that said Letters Patent is hereby corrected as shown below:

In the Specification

In Column 1 Line 8 (approx.), after "No." insert --13/159,260--.

Signed and Sealed this
Thirteenth Day of October, 2020

Andrei Iancu
*Director of the United States Patent and Trademark Office*